May 19, 1959

W. K. SCHMID 2,887,635

ELECTRIC TRACER CONTROL SYSTEM FOR
MACHINES SUCH AS MACHINE TOOLS

Filed Feb. 15, 1954

INVENTOR:
WOLFGANG KARL SCHMID

BY

PATENT AGENT

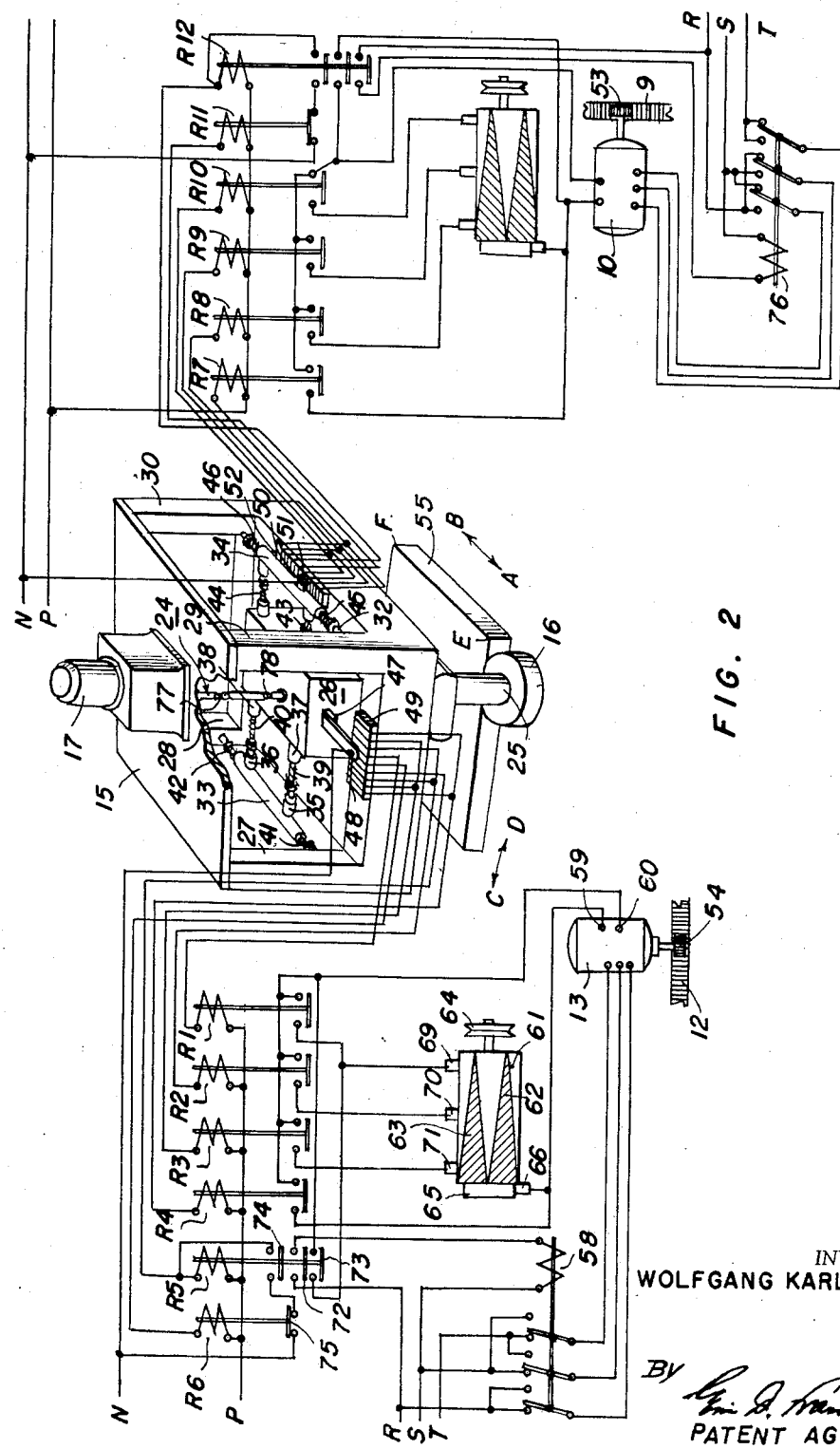

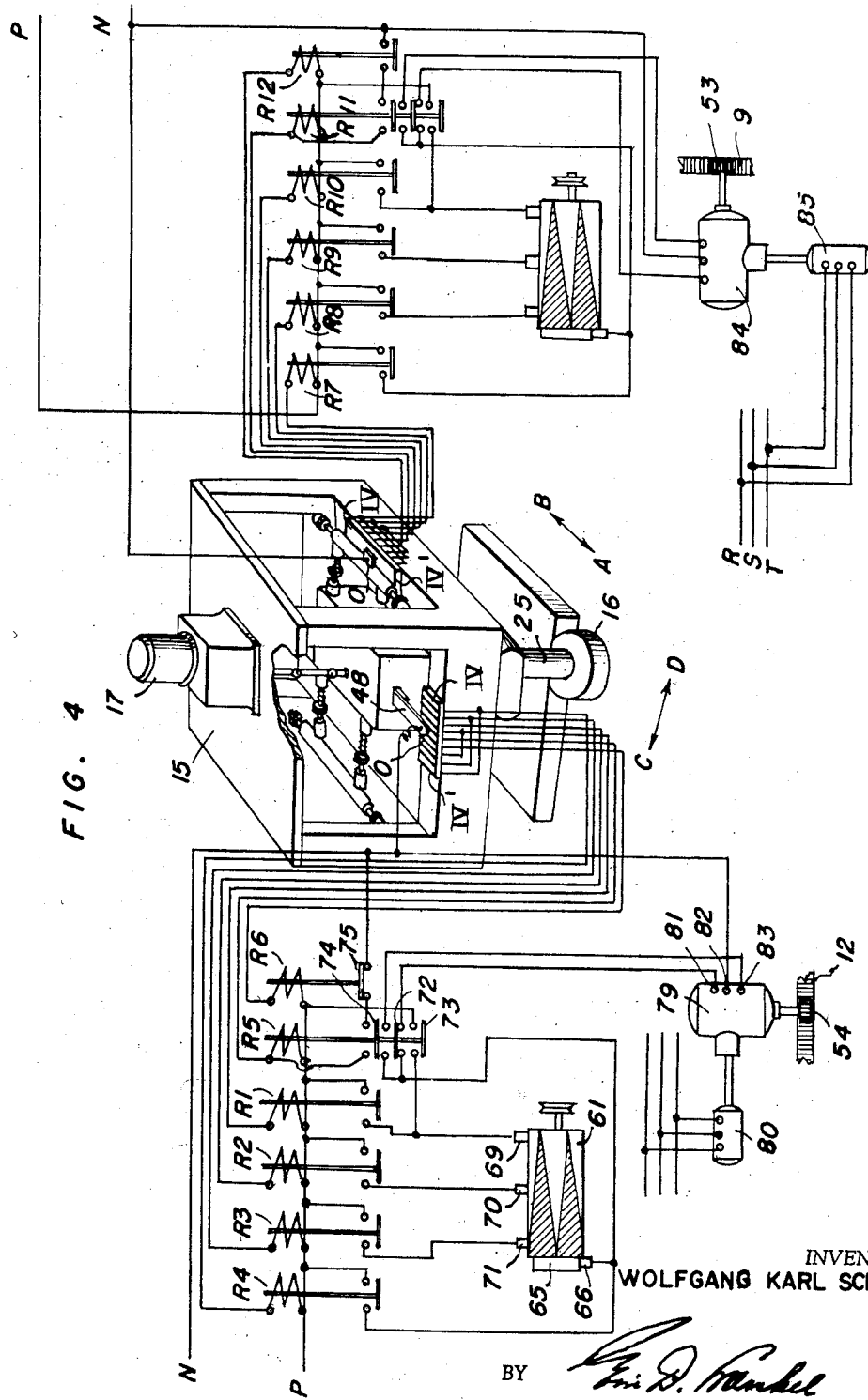

United States Patent Office 2,887,635
Patented May 19, 1959

2,887,635

ELECTRIC TRACER CONTROL SYSTEM FOR MACHINES SUCH AS MACHINE TOOLS

Wolfgang Karl Schmid, Gagny, France

Application February 15, 1954, Serial No. 410,230

Claims priority, application Germany February 13, 1953

10 Claims. (Cl. 318—19)

Electric tracer control systems for welding machines have been known in which a templet, model or pattern is traced by a magnetic or magnetizable roller, whereby the axis of said roller is displaced to actuate electrical control members controlling motors adapted to be operated step by step.

It is an object of the present invention to simplify and improve such tracer control systems.

It is a further object of this invention to provide a control system without step-by-step operable motors having as electric control member a plurality or a bank of stationary contacts on which a slide contact rides, whereby several relays connected to these stationary contacts are adapted to control certain predetermined numbers of revolutions of the drive motors. In addition to savings obtained in the manufacturing cost by the new control apparatus, the safety of operation is increased by the application of the method according to this invention.

Examples of the invention will be described in the following with reference to the appended drawings, in which, Figure 1 is a perspective view of an automatic welding or cutting machine equipped with the new electric tracer control device according to the invention.

Figure 2 shows details of the tracer head of Figure 1 with the magnetizable tracer roller and the electric control circuit diagram to explain the principle of operation of the new apparatus and method, parts of the perspectively and diagrammatically illustrated tracer head being broken away to show the inner elements of this device.

Figure 4 show the details of an electrical copying machine equipped with electro-magnetic reversing clutches as control drives in a perspective and diagrammatic illustration which is similar to that of the embodiment of Figure 2.

Figure 1:
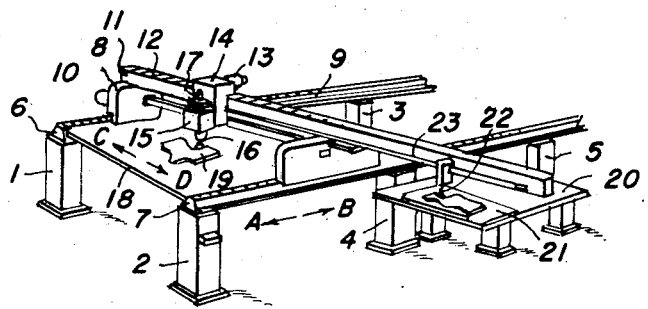

The welding machine shown in Figure 1, is equipped with an electrical copying device, according to the present invention, and supported by five columns or posts 1, 2, 3, 4 and 5, on which guide rails 6 and 7 are mounted. A cross slide 8 is adapted to slide on these guide rails 6 and 7 whereby said slide 8 can be displaced in directions indicated by arrows A and B. A rack 9 is provided on the guide rail 6, the displacing movement of this slide 8 being obtained with the aid of said rack 9. A driving member 10 rotates a gear (not shown) engaging the rack 9 whereby the slide 8 is advanced or displaced. A guide rail 11 having a rack 12 is mounted on the slide 8. A second driving member 13, attached to a support 14, is adapted to rotate a further gear (not shown), said gear engaging the rack 12 so that this support 14 can be moved or displaced in directions indicated by arrows C and D. A tracer head 15 is carried by the support 14, a magnetizable roller 16 extending from the lower end of said tracer head 15. The magnetizable roller 16 is rotated by a motor 17. A plate 18 is mounted on the two guide rails 6 and 7. A template 19 can be secured to this plate 18, the contour of said template 19 being traced by the magnetizable roller 16 when the latter is guided along and in contact with said contour during the tracing operation. A plate or base 20 supports a workpiece 21 secured thereto.

In the embodiment of Figure 1, a welding torch 22 is shown during the operation of preparing a cutout in the workpiece 21. This welding torch is attached to a control bar 23 which is secured to the support 14. The copying device operates in such a manner that the magnetizable roller 16 rolls along and in contact with the contour or periphery of the template 19 whereby the axis of this magnetizable roller 16 is displaced to control the drive members 10 and 13 with the result that the support 14 continuously responds to the displacements or movements of this magnetizable roller. Consequently, the welding torch 22 responds also to these displacements or movements and cuts in the work-piece 21 a contour corresponding to that of the template 19.

The principle of operation of the tracer with the magnetizable roller and the electric control is shown in Figure 2. The magnetizable roller 16 is driven by the motor 17 with the aid of a Cardan or flexible shaft 24 at a constant speed. A shaft 25 carrying on its lower end this magnetizable roller 16 is mounted in the tracer casing 26. A coil (not shown) to be connected to a direct current source is provided in this tracer casing 26, said coil being adapted to magnetically energize the magnetizable roller 16. The shaft 25 with the casing 26 can be displaced about 1–2 mm. in the directions A, B and C, D. To permit the displacements or movements in the directions A and B, the tracer head 15 is provided with corner columns 27, 28, 29 and 30, of rectangular cross section, of which the columns 27 and 28 on one side of the tracer head 15 hold a bolt 31 between them, while the columns 29 and 30 on the opposite side hold a bolt 32 in the same manner. Tube or sleeve members 33 and 34 are slidably mounted on these bolts 31 and 32, respectively. Short bolts 35 and 36 are secured to one side of the tube or sleeve member 33, the free ends of said bolts 35 and 36 being slidably mounted in tube or sleeve members 37 and 38, respectively, which, in turn, are attached to one side of the tracer casing 26. The opposite side of this tracer casing 26 has similar tube or pipe members cooperating with two short bolts mounted on the tube or sleeve member 34 in the same manner as the bolts 35 and 36 are secured to the tube or pipe member 34. A definite central position of the axis of the magnetizable roller 16 is assured by the provision of a system of suitably adjusted helical springs, of which springs 39 and 40 are arranged on the bolts 35 and 36 to rest on the front sides of the tube member 37 and 38, respectively, of the one side of the tracer casing 26, while springs 43 and 44 are mounted in the same manner on the corresponding bolts on the opposite side of said tracer casing 26. Springs 41, 42 and 45, 46 of this spring system are provided on the bolts 31 and 32 to bear on the fronts of the tube or sleeve members 33 and 34, respectively. If the shaft 25 with the magnetizable roller 16 is moved in the direction A, the springs 41 and 45 are compressed. If this shaft 25 with the roller 16 is moved in the direction C, the springs 39 and 40 are compressed. An arm 47, having a slide contact 48 on its free end is mounted on and extends from one side of the tracer casing 26. A bank 49 of contacts provided on the frame of the tracer head 15 is opposite said slide contact 48 which is adapted to slide on and over the contacts of this bank in accordance with the displacements or movements of the tracer casing 26 in the directions C or D, i.e., this slide contact 48 moves to the left or right side, respectively, as a result of such movements. A contact holder 50 is mounted on the tube or sleeve member 34, said contact holder 50 having a slide contact 51 arranged to slide on a contact bank 52 when the magnetizable roller 16 is moved in the directions A or B. The two electro-magnetic drive members or motors 10 and 13 will be connected to the slide contacts 51 and 48, respectively, through relays $R_1$ to $R_6$ and $R_7$ to $R_{12}$, respectively, to control these electro-magnetic drive members in accordance with the displacements of the tracer roller 16. A gear 53 is secured to the shaft of the rotor of the control or drive motor 10, said gear 53 being engaged with the rack 9 on the guide rail 6 (Figure 1), so that the machine slide or carriage on which this control motor 10 and the tracer head 15 are mounted can be moved in the directions A or B by the motor 10. A gear 54 is secured to the rotor shaft of the control motor 13, said gear being engaged with the rack 12 on the guide rail 11, so that the tracer head 15 can be moved in the directions C or D by this motor 13.

If the magnetizable roller 16 is rotated by the motor 17 in counter-clockwise direction, while this roller 16 remains in contact with the periphery or contour of the template 55, the roller shaft 25 moves in the direction D. A sufficient contact pressure of the roller 16 against the surface of the template 55 is produced by the magnetic attraction. As a result of this, the casing 26 is likewise displaced in the direction D and the springs 43 and 44 are compressed, while the opposite springs 39 and 40 are somewhat relieved. The slide contact 48, which in the rest or neutral position of the tracer contacts a segment O of the contact bank 49, will now be displaced to the right to engage a contact segment I connected to the relay $R_1$, so that this relay $R_1$ becomes energized. The motor 13, which was standing still while the slide contact 48 was engaging the segment O, will now run at a low speed and advance the machine slide or support 14 and the tracer head 15 in the direction D, i.e., this tracer head 15 responds to the displacements of the shaft 25 of the magnetizable roller 16.

Figure 3:
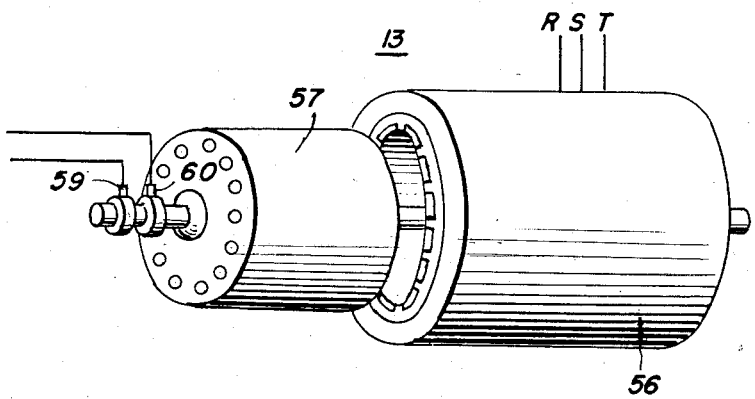
Figure 3 is a perspective side view of the electro-magnetic control drive motor, with reference to which the principle of operation of this control motor will be described.

As shown in Figure 3, the control motor 13 comprises a stator 56 in which a rotor or armature 57 is rotatably mounted. The stator 56 is made as a triphase stator and is adapted to be connected to a three-phase network RST with the aid of the spring biased switch 58 (see Figure 2). During the operation of the control system, the winding of the rotor 57 is interruptedly short-circuited or shunted by means of a rotating control cylinder 61 connected to brushes 59 and 60 engaging or riding on slip rings of this rotor 57 which are connecting to the rotor winding.

The control cylinder 61, as shown in Figure 2, comprises a body of insulating material on the circumference of which a plurality of wedge-shaped or conical segments 62 and 63 of electrically conducting material are mounted, in such a manner that the bases of the cones of these segments are at one front end of the control cylinder, in Figure 2 at the left end, from where they taper toward the opposite, i.e., the right front end of this cylinder. The control cylinder 61 is driven at a constant speed by a motor (not shown) operatively connected to this cylinder with the aid of a belt or the like (not shown) running on a pulley 64 mounted on the end of the shaft of the control cylinder 61. A slip ring 65 electrically connected to the segments 62 and 63 is secured to the left front end of this control cylinder. A stationary brush 66 riding on this slip ring 65 is connected to a rotor terminal 59 of the motor 13. The other rotor terminal 60 is connectable via the contacts of the relay $R_1$ to a brush 69 riding on the surface of the control cylinder 61 and on the segments 62 and 63 at a location close to the vertexes of the cone-shaped segments. If the relay $R_1$ is energized and thereby its contacts are closed, the winding of the rotor of the motor 13 will be short-circuited during the periods the brush 69 engages the conical segments 62 or 63 when the control cylinder 61 is rotating. The time intervals during which this rotor winding is short-circuited via the brush 69 are relatively short, because the widths of the cone-shaped segments are small at the place of engagement with the brush 69 close to their vertexes, so that current pulses with relatively long interruptions are obtained in the rotor winding at regular intervals. As a result of such energization by short current pulses, the rotor of motor 13 and its gear 54 will rotate at a low speed causing the support 14 with the tracer head 15 to move slowly in one of the directions C or D. If the speed of this movement, i.e., of motor 13, is sufficiently slow, the slide contact 48 is displaced further to the right to engage a segment II of the contacts 49, whereby the relay $R_2$ connected to this segment II is energized. When the slide contact 48 leaves the segment I, the associated relay $R_1$ becomes deenergized and its contacts open, so that the brush 69 is disconnected from the rotor terminal 68 of the motor 13.

Due to the energization of the relay $R_2$, its contacts are closed and thereby connect this rotor terminal 60 to a brush 70 riding on the control cylinder at the center thereof, where the width of the conical segments 62 and 63 is larger than that at their vertexes, so that the rotor winding of the motor 13 is short-circuited for longer periods at regular intervals. The resulting longer current pulses in this rotor winding produce a correspondingly higher operating speed of the motor 13 and support 14 with tracer head 15. If this speed is still not sufficient, the slide contact 48 will be still further displaced to the right, whereby, after deenergization of the relay $R_2$ and the resulting opening of its contacts disconnecting the brush 70 from the rotor terminal 60, this slide contact 48 will engage the segment III of the contact bank 49. As this segment III is connected to the relay $R_3$, the latter becomes energized and closes its contacts connecting a brush 71 to the rotor terminal 60. This brush 71 engages the circumference of the control cylinder 61 and the cone-shaped segments 62 and 63 at a place close to their base, so that a still higher speed of the motor 13 and its driven parts is obtained, due to the large widths of these conical segments at their place of contact with the brush 71, resulting in longer current pulses in the rotor winding of the motor 13. The maximum speed of this motor 13 is produced when the slide contact 48 engages a segment IV at the right end of the contact bank 49. This segment IV is connected to the relay $R_4$ which becomes energized at this position by the slide contact 48, whereby the contacts of this relay $R_4$ uninterruptedly interconnect the rotor terminals 59 and 60 and short-circuit the rotor winding, so that the motor 13 will run at full speed.

When, during the tracing, the magnetizable roller 16 arrives at the corner E of the contour of the template 55, the speed of movement of this roller 16 in the direction D is reduced, the motor 13 continuing to run until the slide contact 48 returns by means of springs 43 and 44 to the segment O of the contact bank 49. At this position of the contact slide 48, the rotor winding of the motor 13 remains permanently open because it will be short-circuited no longer via any of the contacts of the relays $R_1$ to $R_4$, so that this motor will stop.

The roller shaft 25 is now moved, with the roller 16 engaging the contour of the template 55, in the direction B, whereby the springs 42 and 46 are compressed as the casing 26 is also moved in the same direction. The slide contact 51 controls the speed of the control motor 10 with the aid of the relays $R_7$ to $R_{10}$ in principally the same manner as described in the foregoing with reference to the motor 13. Therefore, it will not be neecssary to describe in detail the operation and speed control of the motor 10 by the slide contact 51. When the roller 16 arrives at the corner F of the template 55, the motor 10 is stopped, whereupon the shaft 25 moves the roller 16 along another portion of the contour of the template 55 in the direction C. The slide contact 48 is now displaced to the left comprising springs 39 and 40, leaving its neutral position on segment O and engaging a segment I' of the contact bank 49. This segment I' is connected to the relay $R_5$ which now is energized to act via its contacts 72 on the operating coil of the reversing switch 58 connected to said contacts. As a result of the operation of this reversing switch 58, the contacts of which are suitably connected to the stator windings in the motor 13, the direction of the rotating field of the motor 13 is reversed. Contacts 73 of the relay $R_5$, which are also closed by the energization of this relay, connect the brush 69 sliding on the control cylinder 61 to the rotor terminal 60 of the motor 13, so that this motor will run at its lowest speed in an opposite direction from the direction of rotation when the slide contact 48 engages the segment I of the same contact bank 49. As a result of this, the support 14 with the tracer head 15 is moved in the direction C. If the speed of movement of this support 14 with the tracer head 15 is too low, the slide contact 48 will be displaced further to the left, i.e., will leave the segment I' to engage a segment II' of the contact bank 49, so that the relay $R_2$ is energized. The contacts of this relay $R_2$ are now closed and connect the brush 70 to the rotor terminal 60, as described in the foregoing. Control pulses in the rotor winding of intermediate length are the result of the actuation of the relay $R_2$. The relay $R_5$ remains energized during this operation due to the provision of a pair of holding contacts 74 on this relay which are closed when the relay is energized, and the provision of a normally closed relay $R_6$, which only opens when contact 48 assumes the zero position, and which is provided with rest contacts 75, whereby the holding circuit through the coil of the relay $R_5$ is closed via the contacts 74 and 75. When the tracer roller 16 arrives at the next corner of the template 55, the slide contact 48 will return to the segment O of the contact bank 49. The circuit through the coil of the relay $R_6$ will be energized via the slide contact 48 and the segment O engaged thereby with the result that the contacts 75 of this relay $R_6$ will open, so that the holding circuit of the relay $R_5$ will be interrupted with the result that the contacts 72 of this now deenergized relay $R_5$ will open and thereby cause the reversing switch 58 to return to its initial position.

A reversing switch 76, associated with the control motor 10, is controlled by the relay $R_{12}$ in the same manner as the reversing switch 58 of the motor 13 is controlled by the relay $R_5$. The drive shaft 24 of the motor 17, mounted on the tracer head 15, is suitably equipped with articulated joints or couplings 77 and 78, so that the casing 26, in which the shaft 25 is journalled, can be displaced with respect to said drive shaft 24 in the directions A, B and C, D. As the magnetizable roller 16 and its shaft 25 are rotated at the same constant speed, the control motors 10 and 13 are automatically controlled by the novel control means, i.e., the slide contacts 48 and 51 sliding on the contact banks 49 and 52, respectively, in such a manner that the movements of the machine slide or carriage 8 and of the support 14 conform always with the advance movements of the shaft 25 and the magnetizable roller 16.

Figure 4 shows an electrical copying device in which electro-magnetic reversing clutches are provided as control drive mechanisms. In this embodiment of the invention, an electromagnetic reversing clutch 79 is driven by a triphase motor 80 at a constant speed, the gear 54 being secured at the end of the driving shaft of said clutch. This gear 54 engages the rack 12 as in the machine shown in Figure 2. The slide contact 48 of the tracer mechanism controls the relays $R_1$ to $R_6$ in the manner described with reference to the embodiment of Figure 2, whereby, with current pulses produced with the aid of the rotating control cylinder 61, the reversing clutches 79 are interruptedly energized. If the relay $R_1$ is operated, the electro-magnetic reversing clutch 79 will receive current pulses of very short duration via the brush 69 with the result that its driving shaft will rotate very slowly. Upon actuation of the relay $R_2$, the clutch 79 will be energized by longer current pulses via the brush 70 so that the driving shaft of this clutch runs at a higher speed. If the tracer mechanism causes the relay $R_3$ to become operative, the clutch 79 will receive still longer current pulses via the brush 71, so that the driving shaft of this clutch will rotate at a still higher speed. If the slide contact 48 engages the outermost segment IV of the contact bank 49, the relay $R_4$ will be operated with the result that the clutch 79 is permanently energized, so that its driving shaft will rotate at maximum speed. The electro-magnetic clutch 79 has three terminals 81, 82 and 83, of which the terminal 82 is connected to one conductor N of a direct current network or source. When the shaft 25 with the roller 16 is moved in the direction D, the slide contact 48 is displaced in the same direction. This slide contact 48 will engage the segments I, II, III or IV of the contact bank 49, depending upon the speed of the movement or advance of the roller 16 along the contour of the template 55, whereby the relays $R_1$, $R_2$, $R_3$ and $R_4$ are successively energized, so that the running speed of the electro-magnetic clutch 79 is gradually increased. If the shaft 25 with the roller 16 is moving in the direction C, the slide contact 48 is displaced to engage the segment I' of the contact bank 49, so that the relay $R_5$ is energized. This relay $R_5$ causes the clutch 79 to reverse its running direction. The coil of the clutch member for clockwise running is connected to the terminals 81, 82, while the coil of the clutch member for counterclockwise running is connected to the terminals 82, 83. The relay $R_6$ serves to interrupt the holding circuit for the relay $R_5$, when the direction of movement or advance of the shaft 25 with the roller 16 is again reversed, i.e., when the slide contact 48 is displaced from the segment I' to the segment O and then to the segment I. The gear 53 engaging the rack 9 is driven and controlled by an electro-magnetic reversing clutch 84 in principally the same manner. The latter clutch is driven by the motor 83 at a constant speed and receives current pulses of different length by the operation of the relays $R_7$ to $R_{10}$.

In summation, the operation of the control circuit disclosed in Figure 2 is as follows: Initially, motor 17 for the magnetizable roller 16 and the motor (not shown) for the control cylinder 61, are actuated to impart rotational movement to roller 16 and cylinder 61, respectively. The spring biased switch 58 is retained in one position, as for example, to induce a magnetically rotating field in the stator of control motor 13 for forward movement of a tool 22 across a workpiece when the armature of said motor is closed. Thus, as the roller 22 scans the template surface 55 and moves in the direction D, the contact 48 of arm 47 moves across the bank of contacts 49 into position I, for example, whereby relay $R_1$ is energized. Consequently, the rotor winding of motor 13 is intermittently closed through the intermediary of brush 69, as the conductive wedge-shaped portions of control cylinder 61 move past said brush, thereby energizing the motor 13 and displacing tool 22 relative to the workpiece to perform the desired machining operation on said workpiece. In the event the roller 16 is scanning the template 55 at a greater rate than the feed movement of the tool, contact 48 will move into a new position with respect to the bank of contacts 49, as for example position II, and thus energize relay $R_2$, whereby the rotor winding of the control motor 13 is closed for greater periods of time, thereby imparting a greater feed movement to the tool 22. Finally, when contact 48 reaches position IV, relay $R_4$ is energized and control motor 13 operates uninterruptedly at full speed. When roller 16 moves in the direction C, the contact 48 moves into position I', closing relays $R_5$ and $R_5$, the latter of which causing switch 58 to move into a second position to reverse the direction of rotation of the rotating field of the stator to reverse motor 13. Similarly, if roller 16 is scanning the template 55 at a greater rate than the feed movement of the tool, contact 48 will move into a new position with respect to the bank of contacts 49, as for instance position II', to energize relay $R_2$ to impart a greater feed movement to the feed tool in a manner already detailed above. It will be readily apparent that the movement of roller 16 in the direction A—B will energize relays $R_7$—$R_{12}$ in a similar manner to impart lateral movement to the feed tool. The system of Figure 4 is substantially similar to that of Figure 2, however differing in the feature of utilizing electromagnetic reversing clutches as control drive mechanism. However, the operation of the electric control circuit is similar to that described with reference to Figure 2.

Although the new control system and its operation have been described and illustrated by way of example as embodied in two machines, it will be evident to those skilled in the art that various modifications may be made in the details of the new system without departing from the principles herein set forth.

Thus, the tracer mechanisms may be constructed in a different manner than those shown. For example, the tracer shaft may be mounted or suspended by means of a universal or Cardan joint. Furthermore, a different relay arrangement and/or another control cylinder design may be used. While in the embodiment shown and described, magnetically energized tracer rollers are employed, non-magnetic tracer rollers may be used in the inventive control system, because only very small forces are required to displace the slide contacts in the tracer mechanism. The contour of the template or model is automatically traced by the tracer roller at a constant circumferential velocity, whereby the speed of the control drive motors of the machine slides, carriages or supports is adjusted in such a manner that the resulting speed of movement or displacement, derived from the two slide or carriage motions, is always adapted to the advance of the tracer roller. The new control system can be applied to all kinds of machines, including automatic or half-automatic machine tools, sewing machines, etc.

I claim:

1. In an electric tracer control system for machines in which a slide means is slidably mounted on a guiding member and a cross slide means is slidably mounted on said first slide means to be displaced transversely thereon and with respect to a stationary template or model the contour of which is to be traced, separate drive mechanisms for each of said slide means, a tracer head secured to said cross slide means, a tracer lever in said tracer head and extending therefrom, a roller mounted on the free end of said tracer lever and being adapted to be guided in engagement with and along said contour, driving means in said tracer head to rotate said roller, means to mount said tracer lever in said tracer head so that said lever can swing in the moving directions of said slide means, two sliding contact units, each having a linear contact bank member with a plurality of contacts and a slide contact member adapted to slide on said bank member, one of said members of each of said units being secured to said tracer head, the other of said members of each of said units being associated with said tracer lever, said sliding contact units being mounted on said tracer head and said tracer lever in such a manner that one of said units operates by displacing its slide contact member on the respective contact bank member when said tracer lever is displaced in the moving directions of one of said slide means, while the other of said units operates in the same manner when said tracer lever is displaced in the moving directions of the other of said slide means, two groups of speed control circuits associated with two groups of control relays, two groups of individual energizing circuits through the coils of said relays, each of said energizing circuits including one of said contacts of one of said bank members and the associated slide contact member, one of said groups of said control relays, energizing circuits and speed control circuits being designated to and operatively interconnecting one of said contact units and one of said drive mechanisms, the other of said control relays, energizing circuits and speed control circuits being designated to and operatively interconnecting the other of said contact units and the other of said drive mechanisms so that the speeds of the two drive mechanisms are controlled by respective groups of speed control circuits in such a manner that the resultant speed derived from the two component movements of said drive mechanisms is automatically adjusted to the advance speed of said roller on and along said contour.

2. In an electric tracer control system according to claim 1, wherein said means to mount said tracer lever in said tracer head includes adjustable springs adapted to hold said tracer lever in neutral position wherein said roller does not engage said contour, in which position said sliding contact members do not engage any of the contacts of said bank members which would cause either of said two drive mechanisms to run.

3. In an electric tracer control system according to claim 1, wherein an electro-motor is secured to said tracer head, said electro-motor being adapted to be connected to a current source to rotate said roller at a substantially constant speed and wherein flexible shaft connecting means are inserted between said electro-motor and said roller.

4. In an electric tracer control system according to claim 1, said roller being magnetic so that it will be attracted by a ferrous template or model.

5. In an electric tracer control system according to claim 1, wherein said roller is made of magnetizable material and wherein an energizing coil is provided in said tracer lever mounting means, said energizing coil being connected to a source of current to magnetize said roller.

6. In an electric tracer control system for machines in which a slide means is slidably mounted on a guiding member and a cross slide means is slidably mounted on said first slide means to be displaced transversely thereon and with respect to a stationary template or model the contour of which is to be traced, separate drive mechanisms for each of said slide means, a tracer head secured to said cross slide means, a tracer lever in said tracer head and extending therefrom, a roller mounted on the free end of said tracer lever and being adapted to be guided in engagement with and along said contour, driving means in said tracer head to rotate said roller, means to mount said tracer lever in said tracer head so that said lever can swing in the moving directions of said slide means, two sliding contact units each having a linear contact bank member with a plurality of contacts and a slide contact member adapted to slide on said bank member, one of said members of each of said units being secured to said tracer head, the other of said members of each of said units being associated with said tracer lever, said sliding contact units being mounted on said tracer head and said tracer lever in such a manner that one of said units operates by displacing its slide contact member on the respective contact bank member when said tracer lever is displaced in the moving directions of one of said slide means, while the other of said units operates in the same manner when said tracer lever is displaced in the moving directions of the other of said slide means, two groups of control relays, each of said relays having a pair of working contacts and one energizing coil, two groups of individual energizing circuits through said coils, each of said energizing circuits including one of said contacts of one of said bank members and the associated slide contact member, two groups of individual speed control circuits, each of said speed control circuits including the working contact pairs of one of said control relays and one of said drive mechanisms, one of said groups of said control relays, energizing circuits and speed control circuits being designated to and operatively interconnecting one of said contact units and one of said drive mechanisms, the other of said control relays, energizing circuits and speed control circuits being designated to and operatively interconnecting the other of said contact units and the other of said drive mechanisms, so that by operation of the respective relays the speeds of the two drive mechanisms are controlled by respective groups of speed control circuits in such a manner that the resultant speed derived from the two component movements of said drive mechanisms is automatically adjusted to the advance speed of said roller on and along said contour.

7. In an electric tracer control system according to claim 6, wherein each of said contact members of said two contact units comprises at least six contacts and wherein said control relays, energizing circuits and speed control circuits are provided in corresponding numbers.

8. In an electric tracer control system according to claim 6, wherein each of said speed control circuits comprises a periodic current interrupter operatively connected to and controlled by said pairs of working contacts of said control relays to produce current pulses of different lengths in the respective speed control circuits, said lengths depending upon the particular control relay which is energized.

9. In an electric tracer control system according to claim 8, wherein each of said drive mechanisms comprises an electro-motor running at a constant speed and electro-magnetically operable clutches in its drive connection to the respective slide, said clutches being connected to said periodic current interrupter to be operated and controlled by said control relays.

10. In an electric tracer control system according to claim 9, wherein each of said electro-magnetically operable clutches comprises two reversible clutch members adapted to move the associated slide in two opposite directions and wherein a reversing switch is provided and connected to the energizing coils of said clutch members, and wherein a relay is provided and operatively connected to said reversing switch to actuate the latter, said relay being connected and controlled by one of the contacts of said contact bank member.

References Cited in the file of this patent

UNITED STATES PATENTS

| | | |
|---|---|---|
| 1,541,600 | Steenstrup | June 9, 1925 |
| 1,800,760 | Sleeper | Apr. 14, 1931 |
| 1,891,880 | Anderson | Dec. 20, 1932 |
| 2,345,116 | Hanna | Mar. 28, 1944 |
| 2,474,406 | Tillett et al. | June 28, 1948 |
| 2,494,663 | Lobosco | Jan. 17, 1950 |
| 2,679,620 | Berry | May 25, 1954 |

FOREIGN PATENTS

| | | |
|---|---|---|
| 729,999 | Germany | Dec. 3, 1942 |